United States Patent Office 3,435,406
Patented Mar. 25, 1969

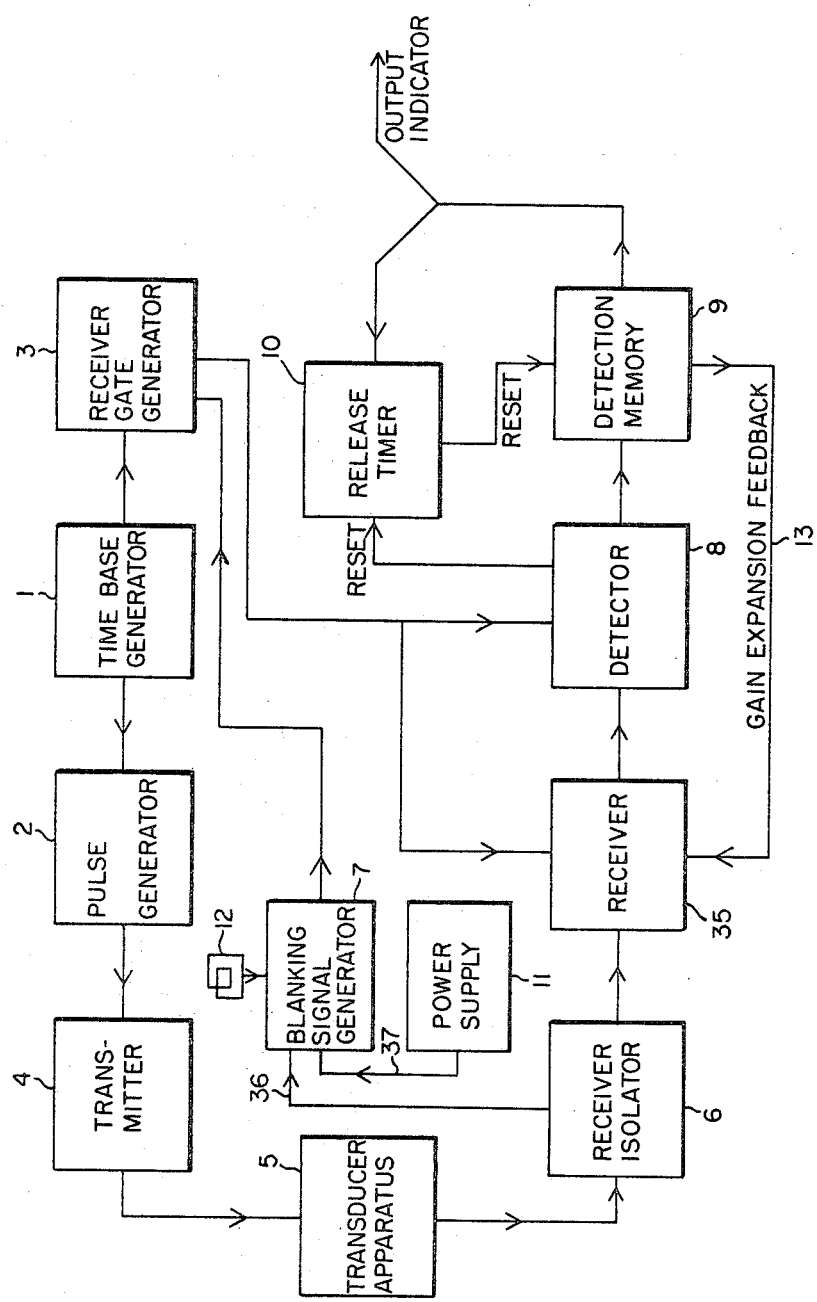

3,435,406
SONIC VEHICLE DETECTOR USING NOISE BLANKING
Donald R. McCauley, Rochester, N.Y., assignor to General Signal Corporation, Rochester, N.Y., a corporation of New York
Filed Apr. 17, 1967, Ser. No. 631,525
Int. Cl. G01s 9/66
U.S. Cl. 340—1                               3 Claims

ABSTRACT OF THE DISCLOSURE

An apparatus for detecting the presence of a vehicle where reflected sonic energy from the surface of the vehicle is recognized and false signals due to electrical noise are rejected. An acoustical transducer emits sonic energy toward the predetermined path of moving vehicles and responds to energy reflected from the vehicle surfaces. A receiver detects the transducer signals and indicates the presence of the vehicle. A noise blanking signal generator senses radiated and conducted electrical noise and suppresses the receiver response for a period contemporaneous with the presence of the electrical noise signals thus rendering the detector apparatus immune to false indications of vehicle presence.

Background of the invention

This invention relates to sonic detectors and more particularly to vehicle sonic detectors rendered immune to radiated and conducted electrical noise signals.

In object detection, sonic energy is widely used as the detection medium. Sonic energy possesses a relatively low velocity in air as compared to other energy sources, e.g. electromagnetic phenomena. This permits design of easily achievable response times using standard system components while still giving sufficient speed of response to enable discrimination between objects moving within normally anticipated speed ranges.

Sonic systems have proven particularly adaptable to vehicle detection and associated traffic control; those employed in the field have substantially proven satisfactory and reliable. In many installations, however, it has been found that the detectors often give false indications of vehicle presence; these occurrences have been traced to system response to electrical noise signals either generated within the system or present within its immediate environment.

To enable the detectors to satisfactorily respond to reflected signals, it is necessary that relatively high gain tuned receivers be utilized. Such receivers respond to both true reflected signals as well as to electrical noise signals possessing the same frequency spectrum as the sonic energy, thus resulting in the detector being unable to distinguish true reflected signals from the electrical noise signals. Generally the noise signals are generated within the detector switching circuits and the associated traffic control equipment; the complex switching required for traffic control creates a particularly high level of noise transients and in most instances when located closely to the detector causes severe and frequent occurrence of false vehicle indication. Obviously any detection system containing elements capable of rendering the system immune to false indications induced by electrical noise signals presents a needed and highly advantageous improvement in the field of vehicle detection and traffic control.

Summary of invention

The present invention contemplates an improved vehicle detector having transducer means periodically emitting sonic energy toward the path of vehicles moving on a roadway and respondingly generating signals relative to reflected sonic energy. A receiver means responsive to the generated transducer means signals manifests an indication of vehicle presence. Means normally operable generates gate signals rendering the receiver means responsive for only selected intervals between successive emissions of sonic energy, the selected intervals extending over a period during which the receipt of reflected sonic energy from the vehicle is anticipated. The improvement of this invention for rendering the detector unresponsive to electrical noise signals has means for sensing electrical noise signals. Other means respond to the sensed electrical noise signals, which means include: an amplifier means having a gain level providing a predetermined responsiveness to the electrical noise signals comparable to that of the receiver means; and transistor means responsive to the amplifier means producing a blanking signal rendering the receiver means unresponsive for a period contemporaneous with the electrical noise signals. The receiver means includes pulse forming means which convert the transducer means signals into operative pulses for manifesting an indication of vehicle presence. The blanking signal renders the pulse forming means inoperative thereby preventing false indications of vehicle presence due to electrical noise signals.

The improved detector system of this invention emits substantially monotonic sonic pulses by means of an electrical acoustical transducer in a direction intercepting the predetermined path of moving vehicles. Reflections of this emitted energy are sensed by the same transducer, which responds by generating corresponding electrical signals. A sharply tuned receiver responds to the transducer signals and due to its tuning rejects most sonic noise not falling within its frequency bandwidth. The receiver is gated so as to be only responsive to transducer signals occurring within a span of time commensurate with the anticipated round trip transit time of the sonic energy transmitted and reflected from the vehicle or object surface. This gating forms a critical and important part in the proper performance and discrimination of the detector.

A noise blanking generator having inputs disposed at various points in the system, where the presence of electrical noise signals are anticipated, produces a signal output effected by the presence of signals on any of its various inputs. This blanking signal controls the responsiveness of the receiver, thus when an electrical noise signal is generated within the system and sensed by the blanking generator, a blanking signal suppresses receiver response for a period contemporaneous with the electrical noise signals thereby resulting in rendering the detector incapable of manifesting an indication of vehicle presence. The blanking signal generator inputs are disposed so as to be sensitive to electrical transients either conducted or radiated and the gain is set to produce a blanking generator response to noise comparable to that of the receiver itself. The duration of the blanking signal is controlled relative to the duration of the electrical noise transient; in most instances noise transients are of extremely short duration and the blanking signal need only last for a relatively short period for encompassing noise induced ringing signals produced in the tank circuits of the receiver. In those instances where noise inputs are of longer duration, the blanking signal is correspondingly increased in duration.

The blanking signal may be utilized in different ways in suppressing receiver response. It may be accomplished by suppressing the gate signal or rendering a portion of the receiver circuitry inactive as well as in a number of other ways which may be more appropriate to a particular application. Thus, this invention contemplates an improved sonic detector immune to manifesting false indications of vehicle presence.

Another object of this invention is a detector wherein a blanking signal initiated by electrical noise signals renders the detector unresponsive for a period contemporaneous with the electrical noise signals.

Yet another object of this invention is an improved sonic detector capable of indicating vehicle presence while operating in a high level of ambient electrical noise.

Another object of this invention is a signal generating unit wherein signals are produced relative to radiated and conducted electrical noise signals.

Another object of this invention is a vehicle sonic detector system capable of indicating vehicle presence while operating in close proximity to traffic controller switch modules.

These and other objects and advantages of this invention are more clearly explained in the following paragraphs and the attached drawings.

*Brief description of the drawings*

The system exemplified in the drawings is arranged in the main for ease of understanding and is not intended to limit the scope of the invention.

FIG. 1 shows a functional block diagram of a typical vehicle sonic detector system incorporating noise blanking.

Figure 2A:
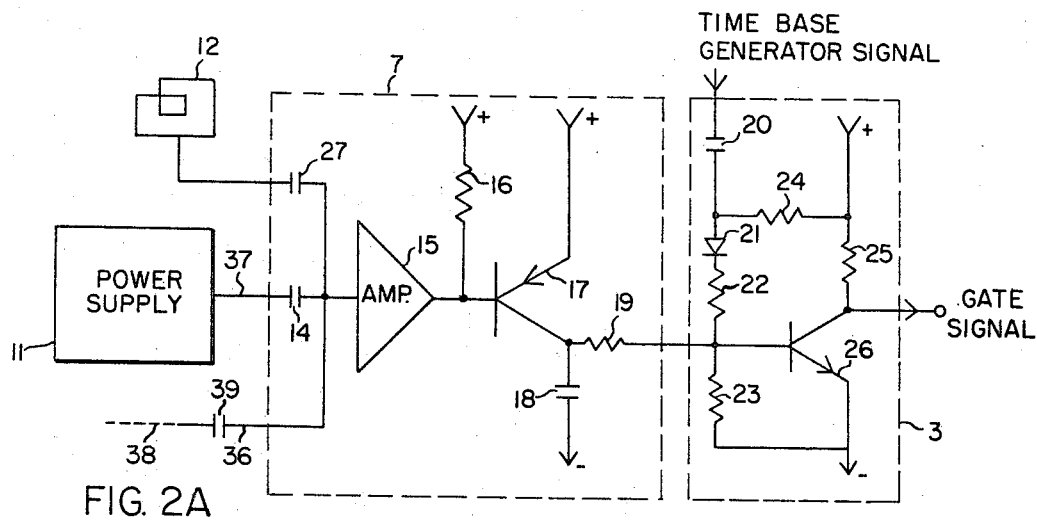
FIG. 2A shows a blanking signal generator used to suppress the system gate signal.

Standard electrical symbols are used in the drawings. A plus sign indicates application of the positive DC power source while an arrowhead indicates connection to a common return for the negative side of the DC power source. Although the drawings demonstrate the preferred embodiments of the invention, the invention should not be construed as to be limited to such embodiments but may be incorporated in the various forms and with such modifications as are obvious to one skilled in the art.

*Description of the preferred embodiments*

The system of FIG. 1 shows a typical vehicle detector system. A time base generator 1 comprising any oscillator of suitable frequency range generates the basic timing pulses for system operation. The period of this generator is determined mainly by the operational parameters and performance requirements of the system. In applications where detection of high speed vehicles is required a shorter period of oscillation is used thereby providing the necessary pulse discrimination while in those systems where relatively slower moving vehicles are detected the period may be appreciably lengthened. Also coming into play in the selection of the oscillator frequency is the anticipated transit time for the signals reflected from the body of the vehicle, i.e. in those installations where the transmitting apparatus is located farther from the vehicles a longer period is of course required. In the system under discussion the time base generator 1 consists of an astable multivibrator with pulses taken from each output of the multivibrator each driving different portions of the system. One pulse output is conducted to a pulse character generator 2 which unit establishes a driving pulse for the transmitted sonic energy.

A transmitter unit 4 driven by the output of the pulse generator 2, produces an electrical signal of substantially single frequency which actuates transducer apparatus 5. The transducer apparatus 5 is directed toward the path of the moving vehicles and emits sonic energy relative to the signal from the transmitter 4. The conversion from electrical signal to sonic energy is accomplished by electromechanical conversion in a manner well known in the acoustical art. As in the case of such transducers, it not only emits sonic energy but also senses received energy from other sources. In this instance the transducer apparatus 5 produces electrical signals equivalent to the sonic energy reflected from the vehicle surface. These response signals are then sensed by the receiver unit 35 through a receiver isolator unit 6 this latter unit provides the proper output impedance for the transducer apparatus 5 as well as attenuating signals produced by the driving pulse from the transmitter 4.

The receiver 35 comprises a series of amplifier stages tuned sharply to the frequency of the sonic energy, thereby eliminating extraneous signals having a frequency content other than that of the transmitted pulses. The detector unit 8 responds to the receiver 35 and initiates an indication of vehicle presence. When a pulse is detected, the detection memory unit 9 is actuated and manifests vehicle presence.

Both the receiver 35 and detector 8 units are gated by the output of the receiver gate generator 3 so as to make them unresponsive to any signals received other than during a selected interval commensurate with the anticipated arrival time of signals reflected from a passing vehicle. This gating feature provides the heart of the system performance for it is this difference in transit time for a transmitted pulse to be reflected back to the transducer apparatus 5 which indicates the presence of an intercepting surface positioned other than normally expected. Such reflecting surface in this system is considered to be a vehicle. Thus the gate defines the interval during which reflected vehicle signals are anticipated and results in rejecting all signals received at times other than during the selected interval. The receiver gate generator 3 is driven by the second output of the time base generator 1 and thus provides a gate signal in a fixed time relation and subsequent to the transmission of a sonic pulse. The selection of the gate interval is of prime importance to the system performance and primarily determines its ability to detect vehicle presence.

After the detection memory 9 indicates vehicle presence, release timer 10 is operated which unit results in extinguishing vehicle presence indication if subsequent reflected signals from the vehicle surface are not continuously received at greater than a minimum predetermined rate. The release timer 10 permits the system to return to normal conditions and be ready for the detection of following vehicles. A gain expansion feedback circuit exemplified by interconnection 13 provides for increasing the gain of the receiver 35 and thereby avoiding loss of vehicle detection caused by normal and expected decreases in reflected signals received from various points on the same surface.

The system, as presented, is in most applications adequately secure so as to avoid false vehicle indications. However, in installations where a high level of radiated and conducted noise is present, which is particularly true where traffic controller modules are located closely to the detector system, it has been found that noise rejection is necessitated. The blanking signal generator 7 provides this noise rejection. As shown the inputs to the blanking signal generator 7 come from a number of various sources. Line 37 is shown as being connected to the power supply and all transients present on the power supply line for the system are brought to the blanking signal generator 7 through this conductor. The power supply 11 supplies all necessary DC power to the system and therefore any introduction of noise on the supply would immediately be sensed by the receiver 35. A loop antenna 12 is also shown as conducting signals to the blanking signal generator 7. This loop antenna is characteristic of any antenna system which may be deployed throughout the detector for sensing radiated electrical transients which might be picked up by the various interconnections contained in the circuitry. Still another line 36 is present and may be connected to any point or points where a particularly high level of electrical transients or noise may be generated. It is intended that the invention not be limited to the noise pickup connections shown but rather may be freely modified to incorporate added inputs to scrutinize other noise generating circuits which may affect performance. In point of fact, the varying pickup points are usually selected and particularly adapted to individual installations.

When a noise signal appears on any of these inputs and is of a magnitude normally sufficient to produce a receiver 35 response, the blanking generator 7, its sensitivity established by a predetermined gain level setting, produces an output signal. Such output signal or blanking signal, as hereafter referred to, is conducted to the receiver gate generator 3 and suppresses the gate signal for a period contemporaneous with the noise signal. This effectively makes the receiver 35 and detector 8 respectively unresponsive to any signals whether noise or true reflections received during this period and thereby renders the system immune to false indications of vehicle presence resulting from electrical noise signals. The blanking signal may also be conducted to the detector unit 8 instead of the receiver gate generator 3 and cause the detector to become inoperable for the duration of the blanking signal, thus similarly preventing actuation due to noise signals.

FIG. 2A presents circuitry for accomplishing blanking signal gate suppression upon the occurrence of electrical noise transients. Normally the receiver gate generator 3 receives a signal from the time base generator 1 which initiates a gate signal by causing transistor 26 to shut off for a predetermined time. Prior to the receipt of this time base signal, capacitor 20 is charged to a relatively low voltage determined by the relative magnitudes of the positive voltage appearing at the output of the time base generator, and that appearing at the junction of resistor 24 and capacior 20. The positive voltage or bias appearing at this junction of resistor 24 and capacitor 20 also maintains transistor 26 in an "on" condition thereby holding its collector close to ground. When a signal from the time base generator 1 is received which is a negative going signal, the base of transistor 26 must also go negative in that the voltage across the capacitor cannot be instantaneously changed and this negative signal appearing at the base of transistor 26 is maintained in accordance with the charge time of capacitor 20 through resistor 24. As the base of transistor 26 goes negative, transistor 26 is shut off and a positive signal appears on its collector thusly constituting the gate signal. This positive signal is maintained until transistor 26 is again turned on by the charging of capacitor 20.

When a transient is sensed or picked up by loop antenna 12, conductor 36 attached to the signal shields, or conductor 37 coming from the power supply, transistor 17 of the blanking signal generator 7 is turned "on" thereby causing a positive voltage to appear on the collector of transistor 17 and be conducted through resistor 19 to the base of transistor 26. This positive voltage clamps the base of transistor 26 positively and prevents transistor 26 from ever being turned "off" or if having been turned "off" causes it to be turned "on," thus preventing any gate signal output for as long as a positive signal is maintained on the collector of transistor 17. Capacitor 18 connected between the collector of transistor 17 and ground provides a short time delay for extinguishing the blanking signal after cessation of the electrical transient, thus giving some width to the blanking signal for its utilization in the receiver gate generator 3 to obviate continued ringing of the noise signal in the tuned circuits of the receiver 35. Capacitors 27, 39 and 14 of the blanking signal generator 7 provide isolation from ground for the input to the amplifier 15 as well as allowing passage of the electrical transients. The amplifier 15 gain is controlled so as to provide comparable response to electrical transients as exists in the receiver 35. Thus any noise signal to which the receiver 35 may respond will also initiate the generation of a blanking signal. The resistor 16 provides the necessary emitter bias for maintaining transistor 17 "on." It is a relatively high value therefore providing a switching threshold level for transistor 17 dependent upon the signal gain of amplifier 15. It must however be carefully selected so as to prevent collector leakage current from turning "on" transistor 17.

Figure 2B:
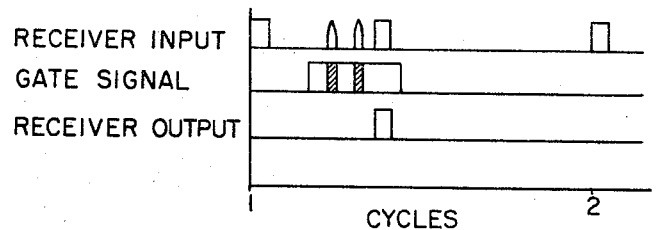
FIG. 2B is a graphical presentation demonstrating the operation of the blanking signal generator and the gate signal generator in combination.

Referring to FIG. 2B, inspection of the various wave forms may prove of value in demonstrating system operation. The first pulse indicates pulses emitted by the transducer apparatus 5. The second and third pulses having sharper aspects represent electrical noise signals. The fourth pulse represents a true vehicle reflection, while the fifth pulse is once again a transmitted pulse for initiation of the second cycle, i.e., a cycle encompasses emission of sonic energy and the anticipated time of reflection.

The gate signal is shown covering an interval shortly after transmission of the initial pulse and continuing for a time encompassing the anticipated transit time of a vehicle reflection. The hatched out areas are contemporaneous with the depicted noise pulses and indicate that during these times the gate signal is suppressed to zero. Thus, the receiver being dependent upon the gate signal to be made responsive cannot react to any signals received during these times. Since blanking signal generated by the electrical noise suppresses the gate, it occurs during the same interval as indicated by the suppressed gate signal. The receiver output indicates only a single pulse relative to a true vehicle reflection received at a time when the gate signal has returned to its normal positive value. Thus, it is obvious that the detector system does not and can not indicate vehicle presence due to the reception of apparent vehicle reflections produced by electrical transients.

Figure 3:
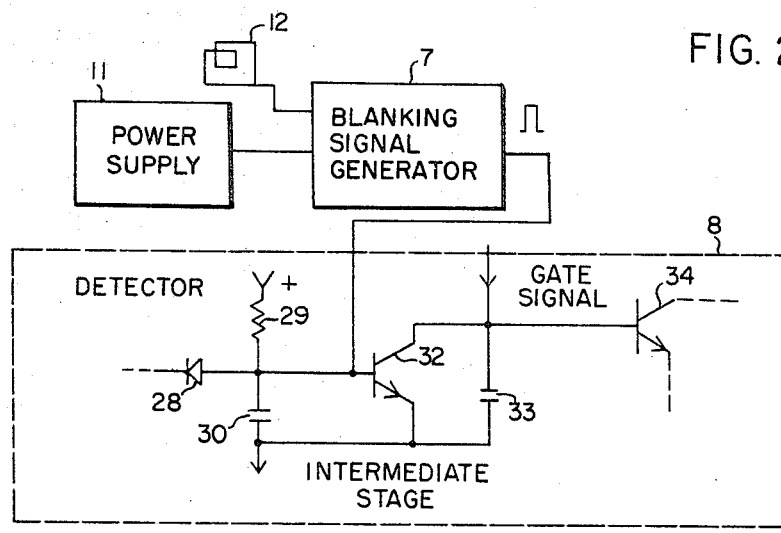
FIG. 3 is a combined schematic and functional block diagram showing an alternative implementation of noise blanking.

FIG. 3 presents an alternative method of achieving noise blanking. In the same fashion as previously described, any electrical noise signals cause the production of a blanking signal by the blanking signal generator 7. In this instance the blanking signal is conducted to the base of a transistor 32 located in an intermediate pulse producing stage of the detector 8.

Normally in system operation, when a negative going signal is conducted through diode 28 to the base of transistor 32, it results in turning off transistor 32. When transistor 32 is off, the capacitor 33 charges up through the gate signal and if transistor 32 remains off for a sufficient duration, the signal on capacitor 33 achieves a level high enough to trigger or turn on transistor 34 which in turn through its associated circuitry results in the formation of an output pulse. When a blanking signal is present, however, the base of transistor 32 is clamped positive as indicated by the positive going pulse shown at the output of blanking signal generator 7. This positive clamp at the base of transistor 32 maintains it in a conducting condition and prevents any signal build-up on capacitor 33 thus making the detector 8 pulse formation circuit inoperative for the duration of the blanking signal. Resistor 29 provides the biasing for transistor 32, and capacitor 33 in conjunction with diode 28 forms part of a filtering and signal detector network.

It must be emphasized and appreciated that a blanking signal generated from electrical noise transients may be introduced into the receiving portion of the system at a number of points making the system unresponsive to environmental electrical noise signals. In the majority of applications, the noise signals under consideration are of relatively short duration with respect to system response time and the development of a blanking signal through capacitor coupling is acceptable. If, however, the noise comprises a relative long time, then the noise signals are coupled so as to generate a longer blanking signal thereby preventing system response throughout the noise duration. Minor system and amplifier modifications well known in the art are easily employed to incorporate this requirement.

Further to the possibility of establishing a plurality of noise pickup inputs, it must be kept in mind that proper impedance levels be maintained in order to prevent gain deterioration of the blanking generator 7. Thus as noise pickup points are multiplied, the impedance coupling networks of necessity must become more complex, but still remain easily achievable within the framework of the state of the art.

The present invention has disclosed an improved vehicle sonic detector system capable of providing a high degree of security against false vehicle indications caused by electrical noise transients. This same noise blanking may be incorporated in any number of various detector system configurations for vehicle as well as object detection. It is therefore intended that those modifications and applications readily ascertainable upon a reading of this disclosure by one skilled in the art be included within the scope and spirit of this invention.

What is claimed is:

1. An improved vehicle detector having transducer means periodically emitting sonic energy toward the path of vehicles moving on a roadway and respondingly generating signals relative to reflected sonic energy, receiver means responsive to the generated transducer means signals for manifesting an indication of vehicle presence, and means normally operable generating gate signals rendering the receiver means responsive for only selected intervals between successive emissions of sonic energy, the selected intervals extending over a period during which the receipt of reflected sonic energy from the vehicle is anticipated; the improvement for rendering the detector unresponsive to electrical noise signals comprising;

means for sensing electrical noise signals; and
   means responsive to the sensed electrical noise signals including:

amplifier means having a gain level providing a predetermined responsiveness to electrical noise signals comparable to that of the receiver means, and transistor means responsive to the amplifier means producing a blanking signal rendering the receiver means unresponsive for a period contemporaneous with the electrical noise signals, the receiver means including pulse forming means converting the transducer means signals into operative pulses for manifesting an indication of vehicle presence and which pulse forming means the blanking signal renders inoperative, thereby preventing false indications of vehicle presence due to electrical noise signals.

2. The detector of claim 1 in which the pulse forming means is rendered operative by the gate signals and is rendered inoperative when the blanking signal renders the gate generating signal means inoperative.

3. The detector of claim 1 wherein said means for sensing comprises antenna means and conducting means for sensing the electrical noise signals.

References Cited

UNITED STATES PATENTS

| 3,191,124 | 6/1965  | Brown   | 325—478 |
| 3,329,932 | 7/1967  | Aver et al. | |
| 3,339,144 | 8/1967  | Squires | 325—478 |
| 3,350,650 | 10/1967 | Kemper  | 325—478 |

FOREIGN PATENTS

| 1,432,257 | 2/1966 | France. |

RICHARD A. FARLEY, *Primary Examiner.*

U.S. Cl. X.R.

340—38